(12) United States Patent
Shibata

(10) Patent No.: US 10,749,358 B2
(45) Date of Patent: *Aug. 18, 2020

(54) RECHARGEABLE BATTERY PROTECTION INTEGRATED CIRCUIT, RECHARGEABLE BATTERY PROTECTION DEVICE, AND BATTERY PACK

(71) Applicant: MITSUMI ELECTRIC CO., LTD., Tokyo (JP)

(72) Inventor: Kohei Shibata, Tokyo (JP)

(73) Assignee: MITSUMI ELECTRIC CO., LTD., Tokyo (JP)

(*) Notice: Subject to any disclaimer, the term of this patent is extended or adjusted under 35 U.S.C. 154(b) by 127 days.

This patent is subject to a terminal disclaimer.

(21) Appl. No.: 16/138,160

(22) Filed: Sep. 21, 2018

(65) Prior Publication Data

US 2019/0181665 A1    Jun. 13, 2019

(30) Foreign Application Priority Data

Dec. 8, 2017   (JP) ................................ 2017-236114

(51) Int. Cl.
*H02J 7/00* (2006.01)

(52) U.S. Cl.
CPC .......... *H02J 7/0031* (2013.01); *H02J 7/0021* (2013.01); *H02J 7/0024* (2013.01); *H02J 7/0026* (2013.01); *H02J 7/00302* (2020.01); *H02J 7/00304* (2020.01); *H02J 7/00306* (2020.01)

(58) Field of Classification Search
CPC .................................................. H02J 7/0031
USPC ....................................................... 320/117
See application file for complete search history.

(56) References Cited

U.S. PATENT DOCUMENTS

| 5,581,170 | A | * | 12/1996 | Mammano | ............ | H02J 7/0019 |
| | | | | | | 320/116 |
| 5,742,148 | A | | 4/1998 | Sudo et al. | | |
| 6,320,355 | B1 | * | 11/2001 | Terada | .................. | H02J 7/0031 |
| | | | | | | 320/136 |

(Continued)

FOREIGN PATENT DOCUMENTS

| JP | 2010-124640 | 6/2010 |
| JP | 2013-055759 | 3/2013 |

OTHER PUBLICATIONS

Notice of Allowance for U.S. Appl. No. 16/138,290 dated Sep. 19, 2019.

*Primary Examiner* — Yalkew Fantu
(74) *Attorney, Agent, or Firm* — IPUSA, PLLC

(57) ABSTRACT

A rechargeable battery protection integrated circuit that protects a rechargeable battery, by turning off a switching circuit inserted in series in a current path between a negative electrode of the rechargeable battery and a negative terminal that is coupled to ground of a load or a charger, includes a power source terminal that electrically connects to a positive electrode of the rechargeable battery, a ground terminal that electrically connects to the negative electrode of the rechargeable battery, a monitor terminal that electrically connects to the negative terminal via a resistor, to monitor a potential of the negative terminal, and a clamp circuit. The clamp circuit monitors a voltage of the power source terminal and a voltage of the monitor terminal, and limits the voltage of the monitor terminal to a voltage lower than or equal to the voltage of the power source terminal.

17 Claims, 4 Drawing Sheets

(56) References Cited

U.S. PATENT DOCUMENTS

| | | | |
|---|---|---|---|
| 2003/0132732 A1* | 7/2003 | Thomas | H02H 9/042 |
| | | | 320/134 |
| 2004/0189259 A1* | 9/2004 | Miura | H02J 7/0031 |
| | | | 320/134 |
| 2005/0077878 A1* | 4/2005 | Carrier | B25F 5/00 |
| | | | 320/134 |
| 2005/0127878 A1* | 6/2005 | Geren | H02J 7/0031 |
| | | | 320/134 |
| 2010/0129700 A1 | 5/2010 | Tanno | |
| 2013/0057221 A1 | 3/2013 | Shibata | |
| 2019/0181665 A1* | 6/2019 | Shibata | H02J 7/0026 |

\* cited by examiner

RECHARGEABLE BATTERY PROTECTION INTEGRATED CIRCUIT, RECHARGEABLE BATTERY PROTECTION DEVICE, AND BATTERY PACK

CROSS-REFERENCE TO RELATED APPLICATIONS

This application is based on and claims priority to Japanese Patent Application No. 2017-236114 filed on Dec. 8, 2017, the entire contents of which are incorporated herein by reference.

BACKGROUND OF THE INVENTION

1. Field of the Invention

The present invention relates to a rechargeable battery protection integrated circuit, a rechargeable battery protection device, and a battery pack.

2. Description of the Related Art

Conventionally, known rechargeable battery protection integrated circuits protect a rechargeable battery by turning off a switching circuit that is inserted in series in a current path between a negative electrode of the rechargeable battery and a negative terminal that is connected to ground of a charger or the load. Such rechargeable battery protection integrated circuits are proposed in Japanese Laid-Open Patent Publication No. 2010-124640 and Japanese Laid-Open Patent Publication No. 2013-055759, for example.

The rechargeable battery protection integrated circuit may be provided with a monitor terminal that is connectable, via a resistor, to the negative terminal that is connected to the ground of the charger or the load. This monitor terminal is used to monitor a potential of the negative terminal.

However, depending on a state in which the rechargeable battery protection integrated circuit is used, when the switching circuit inserted in series to the current path between the negative electrode of the rechargeable battery and the negative terminal is turned off, the potential of the negative terminal may rise to excessively raise a voltage of the monitor terminal.

SUMMARY OF THE INVENTION

Embodiments of the present invention can provide a rechargeable battery protection integrated circuit, a rechargeable battery protection device, and a battery pack, which include a function to protect a monitor terminal from an excessive voltage.

According to one aspect of embodiments of the present invention, a rechargeable battery protection integrated circuit that protects a rechargeable battery, by turning off a switching circuit inserted in series in a current path between a negative electrode of the rechargeable battery and a negative terminal that is coupled to ground of a load or a charger, includes a power source terminal that electrically connects to a positive electrode of the rechargeable battery; a ground terminal that electrically connects to the negative electrode of the rechargeable battery; a monitor terminal that electrically connects to the negative terminal via a resistor, to monitor a potential of the negative terminal; and a clamp circuit configured to monitor a voltage of the power source terminal and a voltage of the monitor terminal, and limit the voltage of the monitor terminal to a voltage lower than or equal to the voltage of the power source terminal.

According to another aspect of the embodiments of the present invention, a rechargeable battery protection device includes a switching circuit inserted in series in a current path between a negative electrode of a rechargeable battery, and a negative terminal that is coupled to ground of a load or a charger; and a rechargeable battery protection integrated circuit configured to protect the rechargeable battery by turning off the switching circuit, wherein the rechargeable battery protection integrated circuit includes a power source terminal that electrically connects to a positive electrode of the rechargeable battery; a ground terminal that electrically connects to the negative electrode of the rechargeable battery; a monitor terminal that electrically connects to the negative terminal via a resistor, to monitor a potential of the negative terminal; and a clamp circuit configured to monitor a voltage of the power source terminal and a voltage of the monitor terminal, and limit the voltage of the monitor terminal to a voltage lower than or equal to the voltage of the power source terminal.

According to still another aspect of the embodiments of the present invention, a rechargeable battery protection device includes a switching circuit inserted in series in a current path between a negative electrode of one of a plurality of rechargeable batteries connected in series, located at a lowest stage of the plurality of rechargeable batteries, and a negative terminal that is coupled to ground of a load or a charger; and a plurality of rechargeable battery protection integrated circuits configured to protect the plurality of rechargeable batteries by turning off the switching circuit, wherein one of the plurality of rechargeable battery protection integrated circuits, provided with respect to the one of the plurality of rechargeable batteries located at the lowest stage of the plurality of rechargeable batteries, includes a power source terminal that electrically connects to a positive electrode of the one of the plurality of rechargeable batteries located at the lowest stage; a ground terminal that electrically connects to the negative electrode of the one of the plurality of rechargeable batteries located at the lowest stage; a monitor terminal that electrically connects to the negative terminal via a resistor, to monitor a potential of the negative terminal; and a clamp circuit configured to monitor a voltage of the power source terminal and a voltage of the monitor terminal, and limit the voltage of the monitor terminal to a voltage lower than or equal to the voltage of the power source terminal.

According to a further aspect of the embodiments of the present invention, a battery pack includes a rechargeable battery; a switching circuit inserted in series in a current path between a negative electrode of a rechargeable battery, and a negative terminal that is coupled to ground of a load or a charger; and a rechargeable battery protection integrated circuit configured to protect the rechargeable battery by turning off the switching circuit, wherein the rechargeable battery protection integrated circuit includes a power source terminal that electrically connects to a positive electrode of the rechargeable battery; a ground terminal that electrically connects to the negative electrode of the rechargeable battery; a monitor terminal that electrically connects to the negative terminal via a resistor, to monitor a potential of the negative terminal; and a clamp circuit configured to monitor a voltage of the power source terminal and a voltage of the monitor terminal, and limit the voltage of the monitor terminal to a voltage lower than or equal to the voltage of the power source terminal.

According to another aspect of the embodiments of the present invention, a battery pack includes a plurality of rechargeable batteries connected in series; a switching circuit inserted in series in a current path between a negative electrode of one of a plurality of rechargeable batteries located at a lowest stage of the plurality of rechargeable batteries, and a negative terminal that is coupled to ground of a load or a charger; and a plurality of rechargeable battery protection integrated circuits configured to protect the plurality of rechargeable batteries by turning off the switching circuit, wherein one of the plurality of rechargeable battery protection integrated circuits, provided with respect to the one of the plurality of rechargeable batteries located at the lowest stage of the plurality of rechargeable batteries, includes a power source terminal that electrically connects to a positive electrode of the one of the plurality of rechargeable batteries located at the lowest stage; a ground terminal that electrically connects to the negative electrode of the one of the plurality of rechargeable batteries located at the lowest stage; a monitor terminal that electrically connects to the negative terminal via a resistor, to monitor a potential of the negative terminal; and a clamp circuit configured to monitor a voltage of the power source terminal and a voltage of the monitor terminal, and limit the voltage of the monitor terminal to a voltage lower than or equal to the voltage of the power source terminal.

Other objects and further features of the present invention will be apparent from the following detailed description when read in conjunction with the accompanying drawings.

DESCRIPTION OF THE PREFERRED EMBODIMENTS

Figure 1:
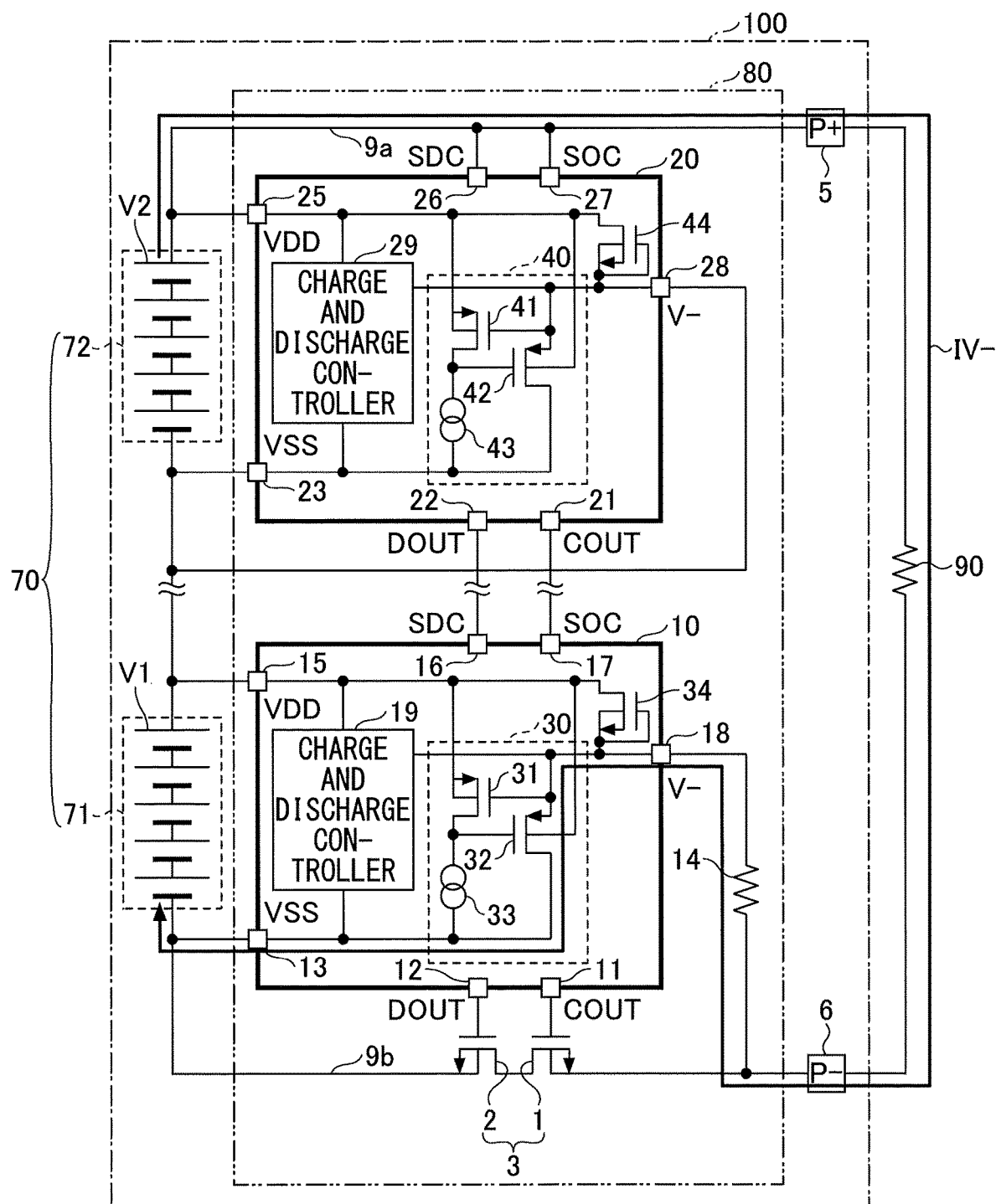
FIG. 1 is a diagram illustrating a structure of an example of a battery pack in a first embodiment.

Embodiments of a rechargeable battery protection integrated circuit, a rechargeable battery protection device, and a battery pack according to the present invention will be described, by referring to the drawings.

FIG. 1 is a diagram illustrating a structure of an example of a battery pack in a first embodiment. A battery pack 100 includes a rechargeable battery 70, and a protection module 80 that protects the rechargeable battery 70. The rechargeable battery 70 may supply power to a load 90 that is connected to load connection terminals 5 and 6. The rechargeable battery 70 is an example of a secondary battery that is chargeable and dischargeable.

The battery pack 100 may be included in the load 90, that is, built-in to the load 90. Alternatively, the battery pack 100 may be connected externally to the load 90. The load 90 is an example of a load that uses the rechargeable battery 70 of the battery pack 100 as a power source. Examples of the load 90 include electric appliances such as an electric power tool, electronic devices such as a portable terminal device, or the like. The electronic devices may include a mobile phone, a smart phone, a computer, a game device, a camera, or the like. Of course, the load 90 is not limited to the devices described above.

The rechargeable battery 70 may be charged by a charger that is not illustrated in FIG. 1 and is connected to the load connection terminals 5 and 6. Examples of the rechargeable battery 70 include a lithium ion battery, a lithium polymer battery, or the like. The rechargeable battery 70 includes a plurality of assembled batteries connected in series. FIG. 1 illustrates an example in which two assembled batteries 71 and 72 are connected in series. The assembled battery 71 is a rechargeable battery formed by a plurality of cells that are connected in series. The assembled battery 72 is a rechargeable battery formed by a plurality of cells that are connected in series.

The protection module 80 is an example of a rechargeable battery protection device. The protection module 80 includes the load connection terminal 5, the load connection terminal 6, and a switching circuit 3, for example.

The load connection terminal 5 is a positive terminal (P+ terminal) to which a power source terminal of the charger or the load 90 is connected. The load connection terminal 6 is a negative terminal (P− terminal) to which the ground of the charger of the load 90 is connected. The load connection terminal 5 is connected to a positive electrode of the rechargeable battery 70 (that is, a positive electrode of the assembled battery 72) via a current path 9a. The load connection terminal 6 is connected to a negative electrode of the rechargeable battery 70 (that is, a negative electrode of the assembled battery 71) via a current path 9b.

The switching circuit 3 is inserted in series to the current path 9b, between the negative electrode of the assembled battery 71 located at a lowest stage of the plurality of assembled batteries 71 and 72, and the load connection terminal 6 that is connected to the ground of the charger or the load 90.

The switching circuit 3 includes transistors 1 and 2, for example. The transistor 1 forms a charge path cutoff part that cuts off a charge path of the assembled batteries 71 and 72. The transistor 2 forms a discharge path cutoff part that cuts off a discharge path of the assembled batteries 71 and 72. In the example illustrated in FIG. 1, the transistor 1 cuts off the current path 9b through which a charge current of the assembled batteries 71 and 72 flows, and the transistor 2 cuts off the current path 9b through which a discharge current of the assembled batteries 71 and 72 flows. The transistors 1 and 2 are switching elements that switch conducting and cutoff states of the current path 9b, and are inserted in series to the current path 9b. The transistors 1 and 2 are NMOS (N-channel Metal Oxide Semiconductor) transistors, for example.

The protection module 80 includes a plurality of protection ICs (Integrated Circuits). The number of protection ICs included in the protection module 80 is the same as the number of assembled batteries 71 and 72 included in the rechargeable battery 70, and is two in this example. In other words, two protection ICs 10 and 20 are provided in FIG. 1. Each of the protection ICs 10 and 20 is an example of a rechargeable battery protection integrated circuit. The protection ICs 10 and 20 perform a protection operation on the assembled batteries 71 and 72, respectively, by turning off the switching circuit 3. The protection IC 10 is provided with respect to the assembled battery 71 located at the lowest stage of the plurality of assembled batteries 71 and 72. The protection IC 20 is provided with respect to the assembled battery 72 located at a highest stage of the plurality of assembled batteries 71 and 72. More particularly, the protection IC 10 is connected in parallel to the assembled battery 71, and operates at a battery voltage V1 between the positive electrode and the negative electrode of the assembled battery 71. Similarly, the protection IC 20 is connected in parallel to the assembled battery 72, and operates at a battery voltage V2 between the positive electrode and the negative electrode of the assembled battery 72. The protection IC 10 and the protection IC 20 are formed by separate chips. The cost may be reduced when the protection ICs 10 and 20 have the same circuit structure.

A charge and discharge controller 19 of the protection IC 10 detects a voltage between a power source terminal 15 (VDD terminal) and a ground terminal 13 (VSS terminal) of the protection IC 10, and monitors the battery voltage V1 of the assembled battery 71. Similarly, a charge and discharge controller 29 of the protection IC 20 detects a voltage between a power source terminal 25 (VDD terminal) and a ground terminal 23 (VSS terminal) of the protection IC 20, and monitors the battery voltage V2 of the assembled battery 72. The charge and discharge controllers 19 and 29 may be formed by combinations of logic circuits, for example.

The power source terminal 15 is a high-potential end power source terminal that is connected to the positive electrode of the assembled battery 71. The ground terminal 13 is a low-potential end power source terminal that is connected to the negative electrode of the assembled battery 71. The power source terminal 25 is a high-potential end power source terminal that is connected to the positive electrode of the assembled battery 72. The ground terminal 23 is a low-potential end power source terminal that is connected to the negative electrode of the assembled battery 72.

The protection module 80 outputs a signal (for example, a high-level signal) that turns on the transistor 1 and a signal (for example, a low-level signal) that turns off the transistor 1, from a terminal 11 (COUT terminal) of the protection IC 10. By turning on the transistor 1, the protection IC 10 permits a current to flow through the current path 9b in a direction that charges the assembled batteries 71 and 72. On the other hand, by turning off the transistor 1, the protection IC 10 prohibits the current to flow through the current path 9b in the direction that charges the assembled batteries 71 and 72.

In addition, the protection module 80 outputs a signal (for example, a high-level signal) that turns on the transistor 2 and a signal (for example, a low-level signal) that turns off the transistor 2, from a terminal 12 (DOUT terminal) of the protection IC 10. By turning on the transistor 2, the protection IC 10 permits a current to flow through the current path 9b in the direction that discharges the assembled batteries 71 and 72. On the other hand, by turning off the transistor 2, the protection IC 10 prohibits the current to flow through the current path 9b in the direction that discharges the assembled batteries 71 and 72.

Similarly, the protection module 80 outputs a signal (for example, a high-level signal) that turns on the transistor 1 and a signal (for example, a low-level signal) that turns off the transistor 1, from a terminal 21 (COUT terminal) of the protection IC 20. In the example illustrated in FIG. 1, the signal output from the terminal 21 is input to a terminal 17 (SOC terminal) of the protection IC 10, and the protection IC 20 turns on and turns off the transistor 1 via the protection IC 10. By turning on the transistor 1, the protection IC 20 permits a current to flow through the current path 9b in the direction that charges the assembled batteries 71 and 72. On the other hand, by turning off the transistor 1, the protection IC 20 prohibits the current to flow through the current path 9b in the direction that charges the assembled batteries 71 and 72.

In addition, the protection module 80 outputs a signal (for example, a high-level signal) that turns on the transistor 2 and a signal (for example, a low-level signal) that turns off the transistor 2, from a terminal 22 (DOUT terminal) of the protection IC 20. In the example illustrated in FIG. 1, the signal output from the terminal 22 is input to a terminal 16 (SOC terminal) of the protection IC 10, and the protection IC 20 turns on and turns off the transistor 2 via the protection IC 10. By turning on the transistor 2, the protection IC 20 permits a current to flow through the current path 9b in the direction that discharges the assembled batteries 71 and 72. On the other hand, by turning off the transistor 2, the protection IC 20 prohibits the current to flow through the current path 9b in the direction that discharges the assembled batteries 71 and 72.

The charge and discharge controller 19 includes an overcharge detection circuit that outputs a charge abnormality detection signal upon detection of an overcharge of the assembled battery 71, when the battery voltage of the assembled battery 71 higher than or equal to a predetermined first overcharge detection threshold value is detected. When the charge and discharge controller 19 outputs the charge abnormality detection signal for the assembled battery 71, the protection IC 10 outputs from the terminal 11 the signal that turns off the transistor 1.

On the other hand, the charge and discharge controller 29 includes an overcharge detection circuit that outputs a charge abnormality detection signal upon detection of an overcharge of the assembled battery 72, when the battery voltage of the assembled battery 72 higher than or equal to a predetermined second overcharge detection threshold value is detected. When the charge and discharge controller 29 outputs the charge abnormality detection signal for the assembled battery 72, the protection IC 20 outputs from the terminal 21 the signal that turns off the transistor 1. The signal output from the terminal 21 is supplied to the charge and discharge controller 19 via the terminal 17.

Accordingly, when the charge abnormality detection signal is output from at least one of the charge and discharge controller 19 and the charge and discharge controller 29, the charge and discharge controller 19 outputs a signal that turns off the transistor 1, from the terminal 11 of the protection IC 10. Hence, regardless of whether the transistor 2 is in the on state or the off state, it is possible to protect the assembled batteries 71 and 72 from overcharge. In addition, even when the charge abnormality is generated in only one of the assembled batteries 71 and 72, it is possible to prohibit charging of both the assembled batteries 71 and 72. As a result, it is possible to not only prohibit charging of the assembled battery in which the charge abnormality is detected, but also prohibit charging of the normal assembled battery in which no abnormality, such as the charge abnormality, is detected.

In addition, the charge and discharge controller 19 includes an overdischarge detection circuit that outputs a discharge abnormality detection signal upon detection of an overdischarge of the assembled battery 71, when the battery voltage of the assembled battery 71 lower than or equal to a predetermined first overdischarge detection threshold value is detected. When the charge and discharge controller 19 outputs the discharge abnormality detection signal for the assembled battery 71, the protection IC 10 outputs from the terminal 12 the signal that turns off the transistor 2.

On the other hand, the charge and discharge controller 29 includes an overdischarge detection circuit that outputs a discharge abnormality detection signal upon detection of an overdischarge of the assembled battery 72, when the battery voltage of the assembled battery 72 lower than or equal to a predetermined second overdischarge detection threshold value is detected. When the charge and discharge controller 29 outputs the discharge abnormality detection signal for the assembled battery 72, the protection IC 20 outputs from the terminal 22 the signal that turns off the transistor 2. The signal output from the terminal 22 is supplied to the charge and discharge controller 19 via the terminal 16.

Accordingly, when the discharge abnormality detection signal is output from at least one of the charge and discharge controller 19 and the charge and discharge controller 29, the charge and discharge controller 19 outputs a signal that turns off the transistor 2, from the terminal 12 of the protection IC 10. Hence, regardless of whether the transistor 1 is in the on state or the off state, it is possible to protect the assembled batteries 71 and 72 from overdischarge. In addition, even when the discharge abnormality is generated in only one of the assembled batteries 71 and 72, it is possible to prohibit discharging of both the assembled batteries 71 and 72. As a result, it is possible to not only prohibit discharging of the assembled battery in which the discharge abnormality is detected, but also prohibit discharging of the normal assembled battery in which no abnormality, such as the discharge abnormality, is detected.

The charge and discharge controller 19 may include a charge overcurrent detection circuit. The charge overcurrent detection circuit outputs a charge abnormality detection signal upon detection of an overcurrent (or charge overcurrent, or excessively large charge current) in the direction that charges the assembled batteries 71 and 72, when a negative terminal voltage lower than or equal to a predetermined threshold value for detecting the charge overcurrent detection is detected. The negative terminal voltage is a voltage between the negative electrode of the rechargeable battery 70 and the load connection terminal 6. The charge and discharge controller 19 can detect the negative terminal voltage by monitoring a voltage between the ground terminal 13 and a monitor terminal 18 (V− terminal). The charge and discharge controller 19 outputs a signal that turns off the transistor 1, from the terminal 11 of the protection IC 10, when the charge overcurrent detection circuit outputs the charge abnormality detection signal. Hence, regardless of whether the transistor 2 is in the on state or the off state, it is possible to protect the assembled batteries 71 and 72 from the charge overcurrent.

The charge and discharge controller 19 may include a discharge overcurrent detection circuit. The discharge overcurrent detection circuit outputs a discharge abnormality detection signal upon detection of an overcurrent (or discharge overcurrent, or excessively large discharge current) in the direction that discharges the assembled batteries 71 and 72, when the negative terminal voltage higher than or equal to a predetermined threshold value for detecting the discharge overcurrent detection is detected. The charge and discharge controller 19 outputs a signal that turns off the transistor 2, from the terminal 12 of the protection IC 10, when the discharge overcurrent detection circuit outputs the discharge abnormality detection signal. Hence, regardless of whether the transistor 1 is in the on state or the off state, it is possible to protect the assembled batteries 71 and 72 from the discharge overcurrent.

The monitor terminal 18 (V− terminal) of the protection IC 10 is connected to the load connection terminal 6 via a resistor 14, and is used to monitor a potential of the load connection terminal 6. The monitor terminal 18 may be used by the charge and discharge controller 19 to monitor the connection of the charger or the load 90 to the protection module 80.

A monitor terminal 28 (V− terminal) of the protection IC 20 is connected to the negative electrode of the assembled battery 72, because the charge and discharge controller 29 does not monitor the potential of the load connection terminal 6. In addition, a terminal 27 (SOC terminal) and a terminal 26 (SDC terminal) of the protection IC 20 are connected to the current path 9a, because the protection IC 20 is connected to the assembled battery 72 located at the highest stage of the plurality of assembled batteries 71 and 72.

The protection IC 10 includes a clamp circuit 30. The clamp circuit 30 monitors a voltage (power source voltage Vdd) of the power source terminal 15, and a voltage (monitor voltage Vm) of the monitor terminal 18. The clamp circuit 30 clamps the monitor voltage Vm at a voltage lower than or equal to the power source voltage Vdd, according to monitored results, to limit the monitor voltage Vm. Because it is possible to prevent the voltage of the monitor terminal 18 from exceeding the voltage of the power source terminal 15, it is possible to protect the monitor terminal 18 from an excessive voltage.

The clamp circuit 30 includes a PMOS (P-channel Metal Oxide Semiconductor) transistor 31, for example. The PMOS 31 includes a source having a potential that follows the potential of the power source terminal 15, and a gate having a potential that follows the potential of the monitor terminal 18. Accordingly, the clamp circuit 30 can use the PMOS transistor 31 to monitor the voltage of the power source terminal 15 and the voltage of the monitor terminal 18.

The clamp circuit 30 includes, in addition to the PMOS transistor 31, a PMOS transistor 32 and a constant current source 33.

In this embodiment, the PMOS transistor 31 has the source connected to the power source terminal 15, the gate connected to the monitor terminal 18, and a drain connected to the ground terminal 13 via the constant current source 33.

The PMOS transistor 32 includes a source having a potential that follows the potential of the monitor terminal 18, a gate having a potential that follows a potential of the drain of the PMOS transistor 31, and a drain connected to the ground terminal 13. In this embodiment, the PMOS transistor 32 has the source connected to the monitor terminal 18, and the gate connected to the drain of the PMOS transistor 31. In addition, in this embodiment, back gates of the PMOS transistors 31 and 32 are connected to the power source terminal 15.

The constant current source 33 has one end connected to the drain of the PMOS transistor 31, and another end connected to the ground terminal 13. The constant current source 33 supplies a constant current IREF to the drain of the PMOS transistor 31. The constant current source 33 may be replaced by a resistor.

The clamp circuit 30 clamps the voltage of the monitor terminal 18 at a clamp voltage Vc that is lower than or equal to the voltage of the power source terminal 15. In this embodiment, the clamp voltage Vc is represented by Vdd−Vth that is obtained by subtracting a threshold voltage Vth of the PMOS transistor 31 from the voltage (power source voltage Vdd) of the power source terminal 15.

Next, an operation of the clamp circuit 30 will be described.

In a state in which the voltage (monitor voltage Vm) of the monitor terminal 18 is lower than the clamp voltage Vc (=Vdd−Vth), the PMOS transistor 31 is in the on state. When the PMOS transistor 31 is in the on state, a gate voltage of the PMOS transistor 32 becomes approximately equal to the power source voltage Vdd, and thus, the PMOS transistor 32 is in the off state. In other words, a part of the clamp circuit 30 (in this embodiment, the gate of the PMOS transistor 31 and the source of the PMOS transistor 32) that connects to the monitor terminal 18 assumes a high-impedance state when the monitor voltage Vm is lower than the clamp voltage Vc.

When the monitor voltage Vm rises and the monitor voltage Vm becomes the same as the clamp voltage Vc, the PMOS transistor 31 starts to turn off. As a result, a drain potential of the PMOS transistor 31 drops, to thereby cause a gate potential of the PMOS transistor 32 to also drop.

When the monitor voltage Vm aims to exceed the clamp voltage Vc, a drain current of the PMOS transistor 31 decreases, and the gate potential of the PMOS transistor 32 drops further. Consequently, a drain current and a source current of the PMOS transistor 32 increase, and the PMOS transistor 32 draws current from the monitor terminal 18. As a result, the monitor voltage Vm is clamped at the clamp voltage Vc that is lower than or equal to the power source voltage Vdd.

Figure 2:
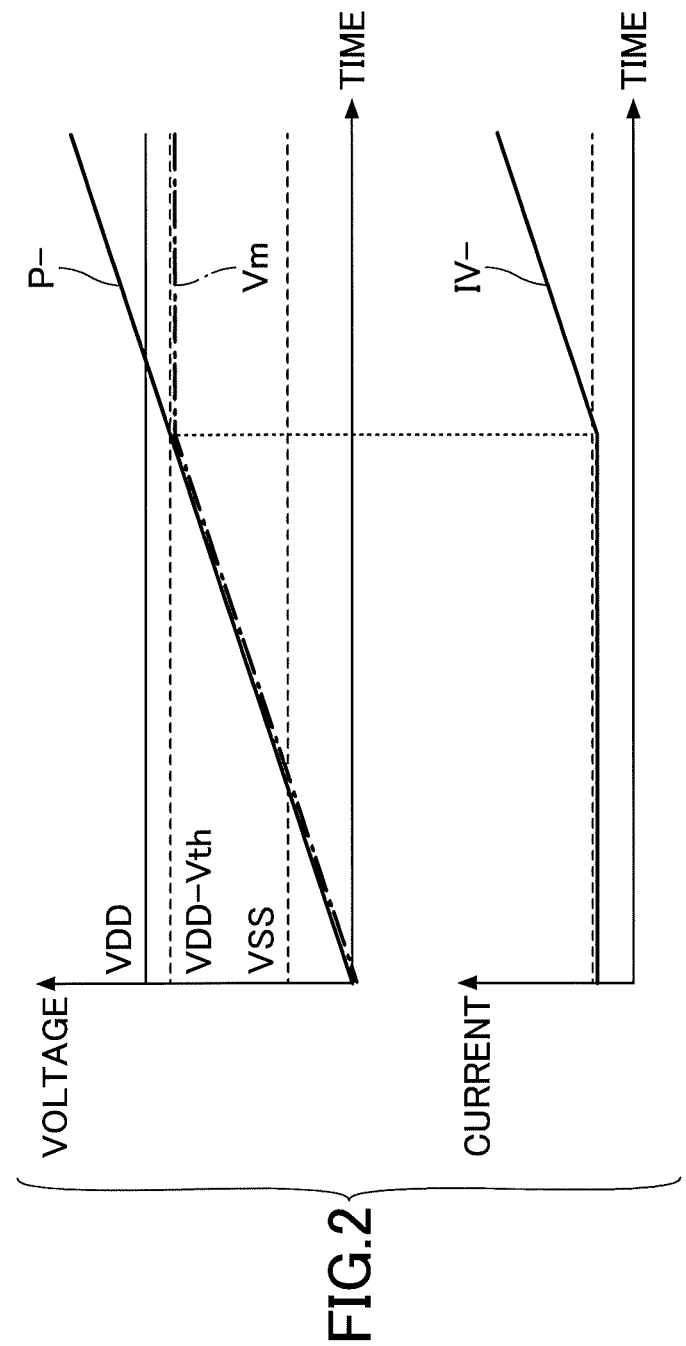
FIG. 2 is a timing chart for explaining an example of an operation of a clamp circuit.

FIG. 2 is a timing chart for explaining an example of an operation of the clamp circuit.

During a time in which the monitor voltage Vm rises, the monitor terminal 18 assumes the high-impedance state, because the PMOS transistor 32 is in the off state. Accordingly, when the potential of the load connection terminal 6 (P− terminal) rises, the monitor voltage Vm rises with a voltage value that is approximately the same as the voltage value of the load connection terminal 6 (P− terminal).

When the monitor voltage Vm aims to exceed the clamp voltage Vc (=Vdd−Vth), the monitor voltage Vm is clamped at the clamp voltage Vc. Even when the potential of the load connection terminal 6 (P− terminal) rises further, the monitor voltage Vm is clamped at the clamp voltage Vc and cannot rise to a voltage exceeding the clamp voltage Vc. A terminal current IV− in a potential difference between the load connection terminal 6 and the monitor terminal 18 flows to the monitor terminal 18, and a current value of the terminal current IV− is limited by a resistance value (for example, 10 MΩ) of the resistor 14.

In FIG. 1, when the transistor 1 or the transistor 2 turns off in the state in which the load 90 is connected to the load connection terminals 5 and 6, the potential of the load connection terminal 6 (P− terminal) rises due to the load 90. For example, if the clamp circuit 30 and a protection element 34 were not provided in the protection IC 10, the potential of the load connection terminal 6 (P− terminal) would rise to the potential of the load connection terminal 5 (P+ terminal) due to the load 90, and an excessive voltage exceeding the voltage of the power source terminal 15 would be applied to the monitor terminal 18. The larger the number of assembled batteries connected in series, the higher the excessive voltage becomes, and the greater the need for an excessive voltage preventing circuit or means for preventing a failure of the protection IC 10.

The protection element 34 connected between the monitor terminal 18 and the power source terminal 15 may be conceivable as an example of the excessive voltage preventing circuit or means. The protection element 34 may be a PMOS transistor having a gate and a source connected to the monitor terminal 18, and a drain connected to the power source terminal 15, for example. The protection element 34 functions as a diode having an anode connected to the monitor terminal 18 and a cathode connected to the power source terminal 15.

According to a structure including the protection element 34 and no clamp circuit 30, even when the potential of the load connection terminal 6 (P− terminal) rises due to the switching circuit 3 that turns off in the state in which the load 90 is connected to the load connection terminals 5 and 6, the rise of the monitor voltage Vm is limited by a sum of the power source voltage Vdd and a forward voltage Vf of the protection element 34. However, current flows in an order of the positive electrode of the assembled battery 72, the load connection terminal 5 (P+ terminal), the load 90, the load connection terminal 6 (P− terminal), the resistor 14, the monitor terminal 18, the protection element 34, the power source terminal 15, and the negative electrode of the assembled battery 72. As a result, the assembled battery 72 is discharged more than the assembled battery 71, and a balance of battery voltages may deteriorate between the assembled battery 71 and the assembled battery 72. In addition, because the monitor voltage Vm becomes higher than the power source voltage Vdd, an erroneous operation may be performed due to a parasitic element within the protection IC 10.

On the other hand, according to this embodiment, the monitor voltage Vm is limited to the power source voltage Vdd or less by the clamp circuit 30, regardless of whether the protection element 34 is provided, and the monitor terminal 18 can thus be protected from an excessive voltage. In addition, because the clamp circuit 30 is built-in to the protection IC 10, it is possible to reduce the cost compared to the case in which a circuit for protecting the monitor terminal 18 from the excessive voltage is connected externally to the protection IC 10.

Further, according to this embodiment, because the drain of the PMOS transistor 32 is connected to the ground terminal 13, the terminal current IV− flows uniformly to all of the cells of the assembled batteries 71 and 72, as illustrated in FIG. 1. In other words, the terminal current IV− flows in an order of the positive electrode of the assembled battery 72, the load connection terminal 5 (P+ terminal), the load 90, the load connection terminal 6 (P− terminal), the resistor 14, the monitor terminal 18, the PMOS transistor 32, the ground terminal 13, and the negative electrode of the assembled battery 71. Accordingly, the balance of the battery voltages are unlikely to deteriorate between the assembled battery 71 and the assembled battery 72.

Moreover, in this embodiment, because the monitor voltage Vm is limited to the power source voltage Vdd or lower, it is possible to prevent an erroneous operation caused by the parasitic element within the protection IC 10. Further, even when the number of assembled batteries connected in series changes, the same clamp circuit 30 may be used by merely changing the resistance value of the resistor 14, which means that the cost can be maintained substantially the same while coping with the change in the number of assembled batteries connected in series.

In the example illustrated in FIG. 1, the protection ICs 10 and 20 have the same circuit structure, in order to reduce the cost by using the same circuit structure. In other words, the protection IC 20 includes a clamp circuit 40 that has the same structure as the clamp circuit 30, and a protection element 44 having the same structure as the protection element 34. The clamp circuit 40 includes two PMOS transistors 41 and 42, and a constant current source 43.

However, even when the potential of the load connection terminal 6 (P− terminal) rises due to the switching circuit 3 that turns off in the state in which the load 90 is connected to the load connection terminals 5 and 6, the voltage of the monitor terminal 28 of the protection IC 20 will not rise. For this reason, it is possible to omit the clamp circuit 40.

Figure 3:
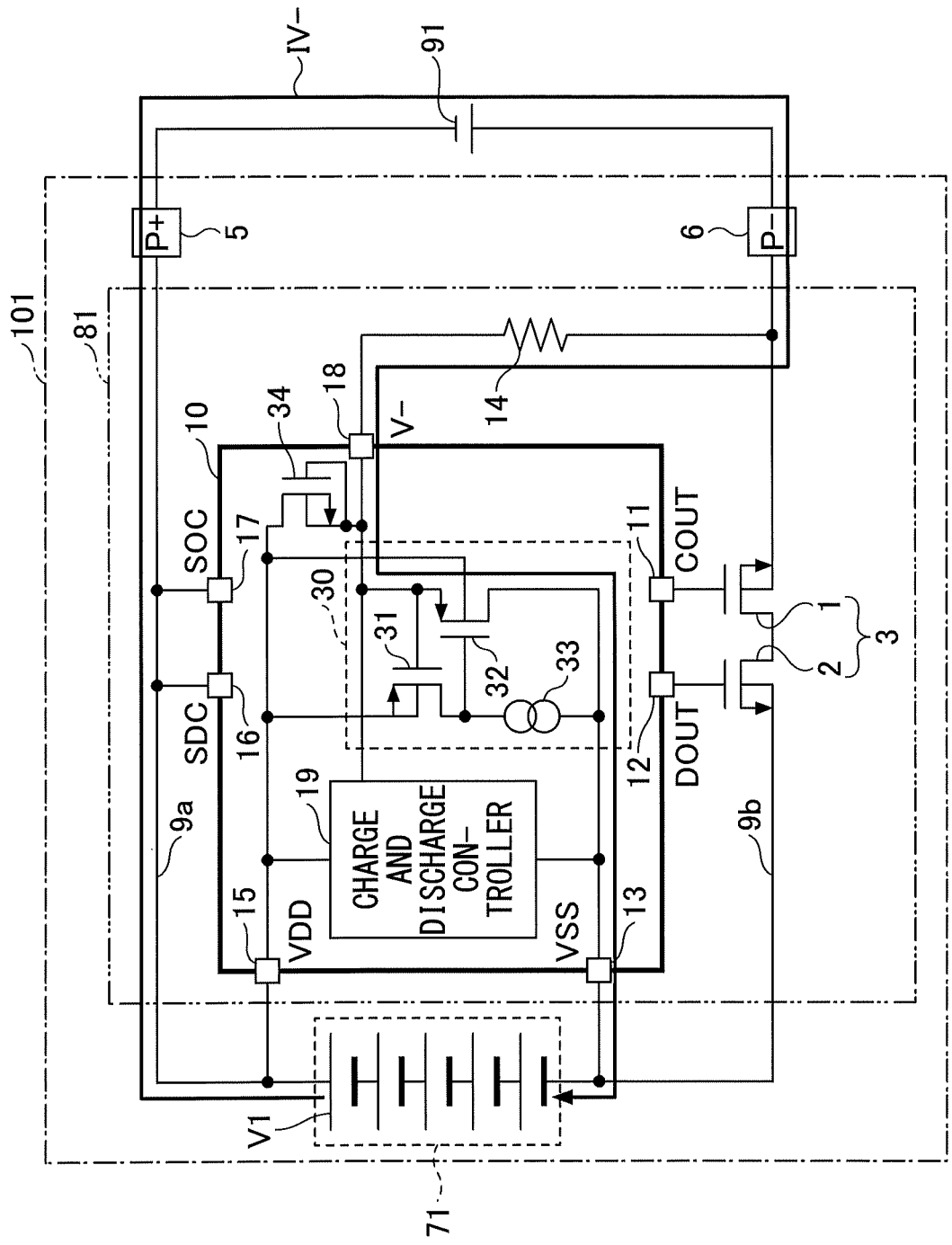
FIG. 3 is a diagram illustrating the structure of an example of the battery pack in a second embodiment.

FIG. 3 is a diagram illustrating the structure of an example of the battery pack in a second embodiment. In the second embodiment, those parts that are the same as those corresponding part in the first embodiment are designated by the same reference numerals, and a repeated description of the same structure, effects, or the like may be simplified or omitted. The second embodiment differs from the first embodiment in that the protection IC is not provided in a plurality of stages. A battery pack 101 in the second embodiment includes an assembled battery 71 that is a rechargeable battery, and a protection module 81 that protects the assembled battery 71. The protection module 81 includes a single protection IC 10.

As illustrated in FIG. 3, when a charger 91 is connected with reversed polarity to the load connection terminals 5 and 6, the charge and discharge controller 19 detects a discharge overcurrent, and outputs from the terminal 12 the signal that turns off the transistor 2. When the transistor 2 turns off, the voltage of the load connection terminal 6 (P– terminal) rises up to the voltage that is a sum of the battery voltage V1 of the assembled battery 71 and a voltage of the charger 91.

However, in this embodiment, the monitor voltage Vm is limited to the power source voltage Vdd or lower by the clamp circuit 30, regardless of whether the protection element 34 is provided, and the monitor terminal 18 can thus be protected from the excessive voltage. In addition, the terminal current IV– is limited to a current value determined by $(V_{91}-Vf)/R_{14}$, where $V_{91}$ denotes the voltage of the charger 91, Vf denotes the forward voltage of the protection terminal 34, and $R_{14}$ denotes the resistance value of the resistor 14.

Figure 4:
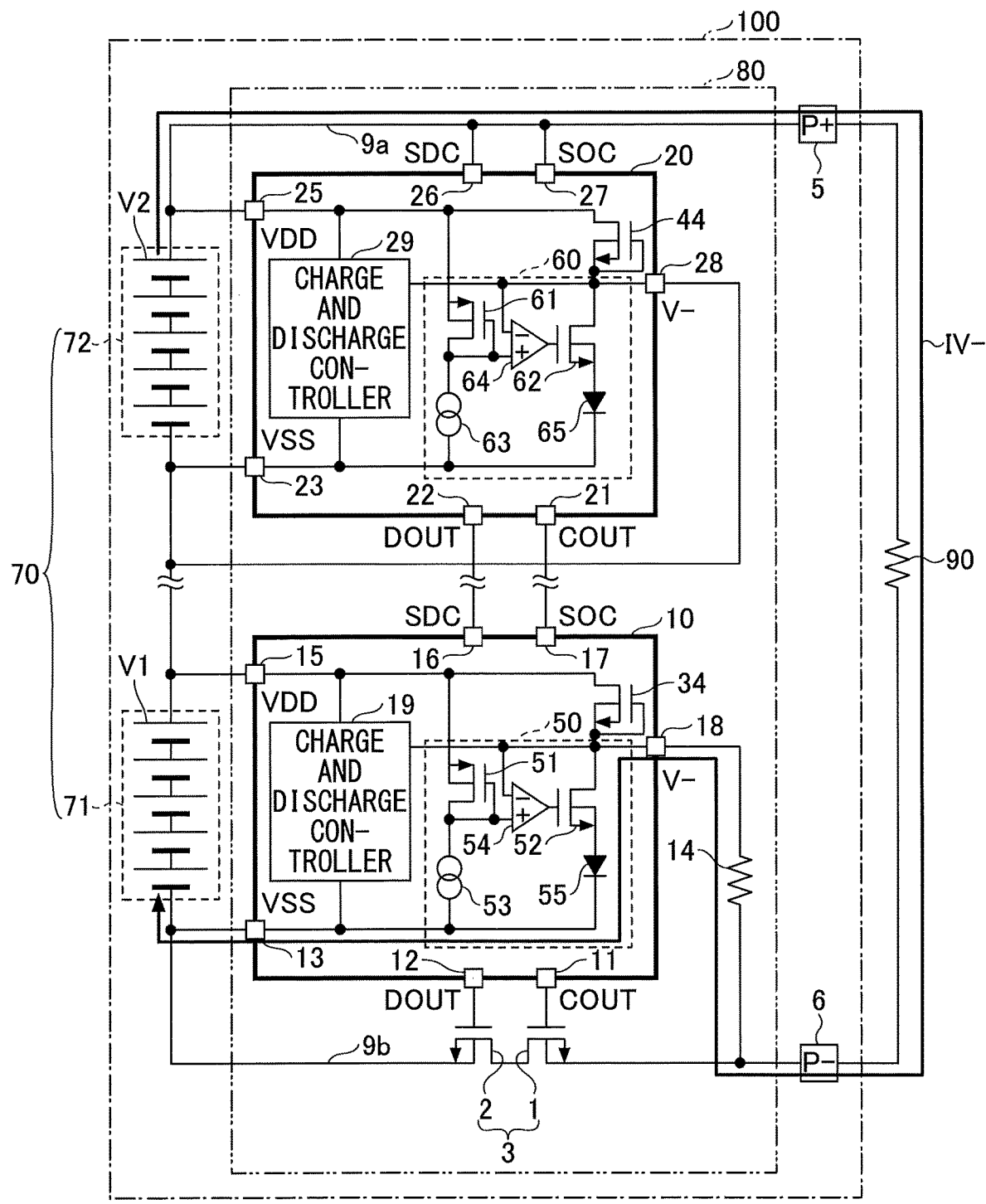
FIG. 4 is a diagram illustrating the structure of an example of the battery pack in a third embodiment.

FIG. 4 is a diagram illustrating the structure of an example of the battery pack in a third embodiment. In the third embodiment, those parts that are the same as those corresponding part in the first and second embodiments are designated by the same reference numerals, and a repeated description of the same structure, effects, or the like may be simplified or omitted. The third embodiment differs from the first embodiment in that a clamp circuit has a circuit structure different from the circuit structure of the clamp circuit 30.

The protection IC 10 in the third embodiment includes a clamp circuit 50. The clamp circuit 50 monitors the voltage (power source voltage Vdd) of the power source terminal 15, and the voltage (monitor voltage Vm) of the monitor terminal 18. The clamp circuit 50 limits the monitor voltage Vm to the power source voltage Vdd or lower, according to monitored results. Hence, it is possible to prevent the voltage of the monitor terminal 18 from exceeding the voltage of the power source terminal 15, and protect the monitor terminal 18 from an excessive voltage.

The claim circuit 50 includes a PMOS transistor 51, for example. The PMOS transistor 51 includes a source having a potential that follows the potential of the power source terminal 15, and a gate having a potential that follows the potential of the monitor terminal 18. Accordingly, the clamp circuit 50 can monitor the voltage of the power source terminal 15 and the voltage of the monitor terminal 18, using the PMOS transistor 51.

The clamp circuit 50 includes, in addition to the PMOS transistor 51, an NMOS transistor 52, a constant current source 53, an operational amplifier 54, and a diode 55.

In this embodiment, the PMOS transistor 51 includes the source connected to the power source terminal 15, the gate connected to a non-inverting input terminal of the operational amplifier 54, and a drain connected to the ground terminal 13 via the constant current source 53. An inverting input terminal of the operational amplifier 54 is connected to the monitor terminal 18, and an output terminal of the operational amplifier 54 is connected to a gate of the NMOS transistor 52. The NMOS transistor 52 includes a drain connected to the monitor terminal 18, and a source connected to the ground terminal 13 via the diode 55.

The diode 55 includes an anode connected to the source of the NMOS transistor 52, and a cathode connected to the ground terminal 13. The diode 55 prevents the generation of a path in which the current that charges the assembled battery 71 flows into the protection IC 10 from the ground terminal 13 and flows out from the monitor terminal 18. The constant current source 53 includes one end connected to the drain of the PMOS transistor 51, and another end connected to the ground 13. The constant current source 53 flows the constant current IREF to the drain of the PMOS transistor 51. The constant current source 53 may be replaced by a resistor.

Because the clamp circuit 50 has the structure described above, it is possible to clamp the voltage of the monitor terminal 18 to the clamp voltage Vc lower than or equal to the voltage of the power source terminal 15. In this embodiment, the clamp voltage Vc is represented by Vdd–Vth that is obtained by subtracting a threshold voltage Vth of the PMOS transistor 51 from the voltage (power source voltage Vdd) of the power source terminal 15. The clamp circuit 50 has an operation circuit characteristic illustrated in FIG. 2.

In the state illustrated in FIG. 4, the protection ICs 10 and 20 have the same circuit structure, in order to reduce the cost by using the same circuit structure. In other words, the protection IC 20 includes a clamp circuit 60 that has the same structure as the clamp circuit 50, and a protection element 44 having the same structure as the protection element 34. The clamp circuit 60 includes two PMOS transistors 61, an NMOS transistor 62, a constant current source 63, an operational amplifier 64, and a diode 65.

However, even when the potential of the load connection terminal 6 (P– terminal) rises due to the switching circuit 3 that turns off in the state in which the load 90 is connected to the load connection terminals 5 and 6, the voltage of the monitor terminal 28 of the protection IC 20 will not rise. For this reason, it is possible to omit the clamp circuit 60.

According to each of the embodiments described above, it is possible to provide a rechargeable battery protection integrated circuit, a rechargeable battery protection device, and a battery pack, which include a function to protect a monitor terminal from an excessive voltage.

Although the embodiments are numbered with, for example, "first," "second," and "third," the ordinal numbers do not imply priorities of the embodiments.

Further, the present invention is not limited to these embodiments, but various variations and modifications may be made without departing from the scope of the present invention.

A part of all of one example of the embodiment may be appropriately combined with or replaced by an example of another embodiment, to provide the variations and the modifications of the embodiments.

For example, although the example described above includes two assembled batteries that are connected in series in the rechargeable battery 70, the number of assembled batteries that are connected in series is not limited to two and may be three or more. In addition, the positions where the control transistors 1 and 2 are arranged in each of FIG. 1, FIG. 3, and FIG. 4 may be interchanged.

What is claimed is:

1. A rechargeable battery protection integrated circuit that protects a rechargeable battery, by turning off a switching circuit inserted in series in a current path between a negative electrode of the rechargeable battery and a negative terminal that is coupled to ground of a load or a charger, the rechargeable battery protection integrated circuit comprising:
   a power source terminal that electrically connects to a positive electrode of the rechargeable battery;
   a ground terminal that electrically connects to the negative electrode of the rechargeable battery;
   a monitor terminal that electrically connects to the negative terminal via a resistor, to monitor a potential of the negative terminal; and
   a clamp circuit configured to monitor a voltage of the power source terminal and a voltage of the monitor terminal, and limit the voltage of the monitor terminal to a voltage lower than or equal to the voltage of the power source terminal.

2. The rechargeable battery protection integrated circuit as claimed in claim 1, wherein the clamp circuit limits the voltage of the monitor terminal to the voltage of the power source terminal or lower, by drawing in a current from the monitor terminal.

3. The rechargeable battery protection integrated circuit as claimed in claim 1, wherein
   the clamp circuit clamps the voltage of the monitor terminal to a clamp voltage lower than or equal to the voltage of the power supply terminal, and
   a part of the clamp circuit electrically connected to the monitor terminal assumes a high-impedance when the voltage of the monitor terminal is lower than the clamp voltage.

4. The rechargeable battery protection integrated circuit as claimed in claim 1, wherein
   the clamp circuit includes a transistor that includes a source having a potential that follows a potential of the power source terminal, and a gate having a potential that follows a potential of the monitor terminal, and
   the clamp circuit monitors the voltage of the power source terminal and the voltage of the monitor terminal, using the transistor.

5. The rechargeable battery protection integrated circuit as claimed in claim 4, wherein the clamp circuit limits the voltage of the monitor terminal to a voltage that is obtained by subtracting a threshold voltage of the transistor from the voltage of the power source terminal.

6. The rechargeable battery protection integrated circuit as claimed in claim 1, wherein the clamp circuit includes
   a first PMOS transistor that includes a source having a potential that follows a potential of the power source terminal, and a gate having a potential that follows a potential of the monitor terminal, and
   a second PMOS transistor that includes a source having a potential that follows the potential of the monitor terminal, and a gate having a potential that follows a potential of a drain of the first PMOS transistor.

7. The rechargeable battery protection integrated circuit as claimed in claim 6, wherein
   the drain of the first PMOS transistor is electrically connected to the ground via a current source or a resistor, and
   a drain of the second PMOS transistor is electrically connected to the ground terminal.

8. A rechargeable battery protection device comprising:
   the rechargeable battery protection integrated circuit as claimed in claim 1; and
   the switching circuit.

9. A rechargeable battery protection device comprising:
   a switching circuit inserted in series in a current path between a negative electrode of one of a plurality of rechargeable batteries connected in series, located at a lowest stage of the plurality of rechargeable batteries, and a negative terminal that is coupled to ground of a load or a charger; and
   a plurality of rechargeable battery protection integrated circuits configured to protect the plurality of rechargeable batteries by turning off the switching circuit,
   wherein one of the plurality of rechargeable battery protection integrated circuits, provided with respect to the one of the plurality of rechargeable batteries located at the lowest stage of the plurality of rechargeable batteries, has a structure of the rechargeable battery protection integrated circuit as claimed in claim 1.

10. A battery pack comprising:
    a rechargeable battery;
    a switching circuit inserted in series in a current path between a negative electrode of a rechargeable battery, and a negative terminal that is coupled to ground of a load or a charger; and
    a rechargeable battery protection integrated circuit configured to protect the rechargeable battery by turning off the switching circuit,
    wherein the rechargeable battery protection integrated circuit includes
       a power source terminal that electrically connects to a positive electrode of the rechargeable battery;
       a ground terminal that electrically connects to the negative electrode of the rechargeable battery;
       a monitor terminal that electrically connects to the negative terminal via a resistor, to monitor a potential of the negative terminal; and
       a clamp circuit configured to monitor a voltage of the power source terminal and a voltage of the monitor terminal, and limit the voltage of the monitor terminal to a voltage lower than or equal to the voltage of the power source terminal.

11. The battery pack as claimed in claim 10, wherein the clamp circuit of the rechargeable battery protection integrated circuit limits the voltage of the monitor terminal to the voltage of the power source terminal or lower, by drawing in a current from the monitor terminal.

12. The battery pack as claimed in claim 10, wherein
    the clamp circuit of the rechargeable battery protection integrated circuit clamps the voltage of the monitor terminal to a clamp voltage lower than or equal to the voltage of the power supply terminal, and
    a part of the clamp circuit electrically connected to the monitor terminal assumes a high-impedance when the voltage of the monitor terminal is lower than the clamp voltage.

13. The battery pack as claimed in claim 10, wherein
    the clamp circuit of the rechargeable battery protection integrated circuit includes a transistor that includes a source having a potential that follows a potential of the power source terminal, and a gate having a potential that follows a potential of the monitor terminal, and the clamp circuit monitors the voltage of the power source terminal and the voltage of the monitor terminal, using the transistor.

14. The battery pack as claimed in claim 13, wherein the clamp circuit of the rechargeable battery protection integrated circuit limits the voltage of the monitor terminal to a voltage that is obtained by subtracting a threshold voltage of the transistor from the voltage of the power source terminal.

15. The battery pack as claimed in claim 10, wherein the clamp circuit of the rechargeable battery protection integrated circuit includes
   a first PMOS transistor that includes a source having a potential that follows a potential of the power source terminal, and a gate having a potential that follows a potential of the monitor terminal, and
   a second PMOS transistor that includes a source having a potential that follows the potential of the monitor terminal, and a gate having a potential that follows a potential of a drain of the first PMOS transistor.

16. The battery pack as claimed in claim 15, wherein the drain of the first PMOS transistor is electrically connected to the ground via a current source or a resistor, and
   a drain of the second PMOS transistor is electrically connected to the ground terminal.

17. A battery pack comprising:
   a plurality of rechargeable batteries connected in series;
   a switching circuit inserted in series in a current path between a negative electrode of one of a plurality of rechargeable batteries located at a lowest stage of the plurality of rechargeable batteries, and a negative terminal that is coupled to ground of a load or a charger; and
   a plurality of rechargeable battery protection integrated circuits configured to protect the plurality of rechargeable batteries by turning off the switching circuit,
   wherein one of the plurality of rechargeable battery protection integrated circuits, provided with respect to the one of the plurality of rechargeable batteries located at the lowest stage of the plurality of rechargeable batteries, includes
      a power source terminal that electrically connects to a positive electrode of the one of the plurality of rechargeable batteries located at the lowest stage;
      a ground terminal that electrically connects to the negative electrode of the one of the plurality of rechargeable batteries located at the lowest stage;
      a monitor terminal that electrically connects to the negative terminal via a resistor, to monitor a potential of the negative terminal; and
      a clamp circuit configured to monitor a voltage of the power source terminal and a voltage of the monitor terminal, and limit the voltage of the monitor terminal to a voltage lower than or equal to the voltage of the power source terminal.

* * * * *